US008275508B1

(12) United States Patent
Adams et al.

(10) Patent No.: US 8,275,508 B1
(45) Date of Patent: Sep. 25, 2012

(54) HISTORY TIMELINE DISPLAY FOR VEHICLE FLEET MANAGEMENT

(75) Inventors: Nathan Adams, Christchurch (NZ); Jason Koch, Aliso Viejo, CA (US); Howard Jelinek, Laguna Beach, CA (US)

(73) Assignee: Telogis, Inc., Aliso Viejo, CA (US)

( * ) Notice: Subject to any disclaimer, the term of this patent is extended or adjusted under 35 U.S.C. 154(b) by 0 days.

(21) Appl. No.: 13/251,129

(22) Filed: Sep. 30, 2011

Related U.S. Application Data

(60) Provisional application No. 61/449,044, filed on Mar. 3, 2011.

(51) Int. Cl.
*G01M 17/00* (2006.01)
*G07C 5/00* (2006.01)

(52) U.S. Cl. ...... 701/29.3; 701/31.4; 340/990; 340/993; 340/995.1; 715/810

(58) Field of Classification Search ............. 701/1, 207, 701/213, 29.3, 31.4; 715/767, 810; 707/758, 707/769, 776; 709/219; 340/990, 993, 995.14, 340/907, 539.1
See application file for complete search history.

(56) References Cited

U.S. PATENT DOCUMENTS 5,638,523 A 6/1997 Mullet et al.
5,808,907 A * 9/1998 Shetty et al. .................. 702/188
5,904,727 A 5/1999 Prabhakaran
6,075,530 A 6/2000 Lucas et al.
6,097,998 A 8/2000 Lancki
6,112,015 A 8/2000 Planas et al.
6,144,920 A 11/2000 Mikame
6,308,120 B1 * 10/2001 Good ........................... 701/29.3
6,339,745 B1 1/2002 Novik
6,477,452 B2 * 11/2002 Good ........................... 701/29.3
6,611,755 B1 8/2003 Coffee et al.
6,879,910 B2 4/2005 Shike et al.
7,143,100 B2 11/2006 Carlson et al.
7,158,136 B2 1/2007 Gannon
7,174,243 B1 2/2007 Lightner et al.
(Continued)

FOREIGN PATENT DOCUMENTS

CA 2607465 A1 * 4/2008
(Continued)

OTHER PUBLICATIONS

Real-time tracking management system using GPS, GPRS and Google earth; Chadil, N.; Russameesawang, A.; Keeratiwintakorn, P.; Electrical Engineering/Electronics, Computer, Telecommunications and Information Technology, 2008. ECTI-CON 2008. 5th Inter. Conf. on;vol. 1; Digital Object Id: 10.1109/ECTICON.2008.4600454; Pub.yr. 2008 , pp. 393-396.*

(Continued)

*Primary Examiner* — Cuong H. Nguyen
(74) *Attorney, Agent, or Firm* — Knobbe Martens Olson & Bear LLP

(57) ABSTRACT

A vehicle management system can generate a vehicle management user interface that depicts vehicle history information in timelines or graphical timelines. These history timelines can include information regarding vehicle location, speed, and idling, among other useful information. The graphical nature of the history timelines can quickly convey vehicle tracking details and potential problems, such as idling and congregation, to an administrator. Further, history timelines for multiple vehicles can be displayed in parallel, allowing comparison between histories for different vehicles.

6 Claims, 8 Drawing Sheets

U.S. PATENT DOCUMENTS

| | | | | |
|---|---|---|---|---|
| 7,395,140 | B2 | 7/2008 | Christie et al. | |
| 7,743,346 | B2 | 6/2010 | Kyle | |
| 7,756,615 | B2 | 7/2010 | Barfoot et al. | |
| 7,828,655 | B2 | 11/2010 | Uhlir et al. | |
| 7,913,179 | B2 | 3/2011 | Sheha et al. | |
| 7,913,188 | B1 | 3/2011 | Krenz et al. | |
| 8,200,376 | B2 * | 6/2012 | Mattingly et al. | 701/3 |
| 2002/0077750 | A1 | 6/2002 | McDonald et al. | |
| 2002/0111715 | A1 | 8/2002 | Richard | |
| 2004/0039504 | A1 | 2/2004 | Coffee et al. | |
| 2004/0077347 | A1 * | 4/2004 | Lauber et al. | 455/428 |
| 2004/0090950 | A1 * | 5/2004 | Lauber et al. | 370/352 |
| 2004/0254698 | A1 | 12/2004 | Hubbard et al. | |
| 2005/0080520 | A1 | 4/2005 | Kline et al. | |
| 2005/0090978 | A1 | 4/2005 | Bathory et al. | |
| 2005/0195096 | A1 | 9/2005 | Ward et al. | |
| 2005/0222933 | A1 | 10/2005 | Wesby | |
| 2006/0100777 | A1 | 5/2006 | Station et al. | |
| 2006/0129691 | A1 | 6/2006 | Coffee et al. | |
| 2006/0212327 | A1 | 9/2006 | Norman | |
| 2008/0014908 | A1 | 1/2008 | Vasant | |
| 2008/0036778 | A1 | 2/2008 | Sheha et al. | |
| 2008/0097731 | A1 | 4/2008 | Lanes et al. | |
| 2009/0326991 | A1 | 12/2009 | Wei et al. | |
| 2010/0076675 | A1 | 3/2010 | Barth et al. | |
| 2010/0211340 | A1 * | 8/2010 | Lowenthal et al. | 702/63 |
| 2011/0016199 | A1 * | 1/2011 | De Carlo et al. | 709/220 |
| 2011/0016514 | A1 * | 1/2011 | De Carlo et al. | 726/5 |
| 2011/0040440 | A1 * | 2/2011 | de Oliveira et al. | 701/30 |
| 2011/0288762 | A1 | 11/2011 | Kuznetsov | |
| 2011/0289019 | A1 | 11/2011 | Radloff et al. | |
| 2012/0072244 | A1 * | 3/2012 | Collins et al. | 705/4 |
| 2012/0101855 | A1 * | 4/2012 | Collins et al. | 705/4 |

FOREIGN PATENT DOCUMENTS

| | | | | |
|---|---|---|---|---|
| WO | WO 02075667 | A1 * | 9/2002 | |
| WO | WO 2011116330 | A2 * | 9/2011 | |

OTHER PUBLICATIONS

UKM campus bus monitoring system using RFID and GIS; Mustapha, A.M.; Hannan, M.A.; Hussain, A.; Basri, H.; Signal Processing and Its Applications (CSPA), 2010 6th International Colloquium on; Digital Object Identifier: 10.1109/CSPA.2010.5545246; Publication Year: 2010 , pp. 1-5.*

Automatic bus routing and passenger geocoding with a geographic information system; Yue-Hong Chou; Vehicle Navigation and Information Systems Conference, 1995. Proceedings. In conjunction with the Pacific Rim TransTech Conference. 6th International VNIS. 'A Ride into the Future; Digital Object Identifier: 10.1109/VNIS.1995.518861; Publication Yea.*

Prognostics, from the need to reality-from the fleet users and PHM system designer/developers perspectives; Hess, A. Aerospace Conference Proceedings, 2002. IEEE; vol. 6; Digital Object Identifier: 10.1109/AERO.2002.1036118 Publication Year: 2002 , pp. 6-2791-6-2797 vol. 6.*

A Cost Effective Real-Time Tracking System Prototype Using Integrated GPS/GPRS Module; El-Medany, W.; Al-Omary, A.; Al-Hakim, R.; Al-Irhayim, S.; Nusaif, M.; Wireless and Mobile Communications (ICWMC), 2010 6th International Conference on Digital Object Identifier: 10.1109/ICWMC.2010.104; Publication Year: 2010 , pp. 521-525.*

A framework algorithm for a real-world variant of the vehicle routing problem; Vu Pham; Tien Dinh; Industrial Engineering and Engineering Management (IEEM), 2011 IEEE International Conference on; Digital Object Identifier: 10.1109/IEEM.2011.6118237 Publication Year: 2011 , pp. 1859-1863.*

Marine fleet allocation using data mining techniques; Ammar, M.H.; Ben Hafssia, S.; Masmoudi, Y.; Chabchoub, H. Logistics (LOGISTIQUA), 2011 4th International Conference on; Digital Object Identifier: 10.1109/LOGISTIQUA.2011.5939394 Publication Year: 2011 , pp. 1-5.*

International Search Report and Written Opinion, International Application No. PCT/US2010/045630, dated Mar. 30, 2011.

Stodolsky et al., "Technology Options to Reduce Truck Idling", Argonne National Laboratory, Transportation Technology R&D Center, University of Chicago, 16 pages, Mar. 15, 2001.

Barcelo et al., "Vehicle Routing and Scheduling Models, Simulation and City Logistics", Dept of Statistics and Operations Research, Universitat Politecnica de Catalunya, pp. 1-29 (accessed Aug. 22, 2011).

MacLean et al., "Real-time Bus Information on Mobile Devices", Department of Electrical Engineering, University of Washington, pp. 1-6 (accessed Aug. 22, 2011).

* cited by examiner

HISTORY TIMELINE DISPLAY FOR VEHICLE FLEET MANAGEMENT

RELATED APPLICATION

This application claims the benefit of priority under 35 U.S.C. §119(e) of U.S. Provisional Patent Application No. 61/449,044, filed on Mar. 3, 2011, entitled "History Timeline Display for Multiple Vehicles," the disclosure of which is hereby incorporated by reference in its entirety.

BACKGROUND

Specialized fleet management software is often used to manage fleets of vehicles, such as trucks or taxis. Typical fleet management systems include functionality for mapping and tracking vehicles. Vehicle tracking is facilitated by communicating with tracking devices installed in vehicles, which typically obtain location and speed information using a global positioning system (GPS). The tracking devices can upload the location and speed information to the fleet management system. In turn, the fleet management system generates a user interface accessible by a fleet administrator to determine vehicle locations, routes, speeds, and so forth.

Some fleet management systems provide historical information about vehicle routes. Such historical information can include start and stop information, vehicle locations at given times, and speed information, or the like. A fleet management system typically outputs this historical information in the form of a list. For example, a fleet management system might provide a map display that includes symbols representing vehicles in a vehicle fleet, and user selection of a vehicle symbol can cause a popup window to display a vehicle history list.

SUMMARY

In certain embodiments, a system for providing history information for a plurality of vehicles includes a computer system including computer hardware programmed to implement a user interface module. The user interface module can at least: receive telematics data corresponding to a plurality of vehicles in a vehicle fleet, the telematics data including location information for the vehicles over time; generate a vehicle management user interface including data representing the plurality of vehicles; output the vehicle management user interface for presentation to a user, where the vehicle management user interface includes a map depicting the plurality of vehicles for selection by the user; receive a selection by the user of first vehicle data from the vehicle management user interface, where the first vehicle data represents a first vehicle of the plurality of vehicles; in response to receiving the selection of the first vehicle data, outputting a first vehicle history timeline including first vehicle status data reflecting at least a portion of the telematics data corresponding to the first vehicle; receiving a second selection by the user of second vehicle data from the vehicle management user interface, the second vehicle data representing a second vehicle of the plurality of vehicles; and in response to receiving the second selection of the second vehicle data, outputting a second vehicle timeline including second vehicle status data reflecting at least a portion of the telematics data corresponding to the second vehicle, the second vehicle timeline able to be displayed together with the first vehicle timeline such that the first and second vehicle timelines can be correlated in time, thereby enabling a visual comparison of the first and second vehicle status data.

A vehicle history user interface for providing history information for a plurality of vehicles can include: a first vehicle history timeline including first vehicle status data corresponding to a first vehicle, the first vehicle status data reflecting first location data obtained from the first vehicle; a second vehicle history timeline including second vehicle status data corresponding to a second vehicle, the second vehicle status data reflecting second location data obtained from the second vehicle; where the first and second vehicle history timelines can be displayed together on the same time scale; and where the vehicle history user interface is that can be generated by a computer system including computer hardware.

Non-transitory physical computer storage can be provided that includes instructions stored thereon for implementing, in one or more processors, a method of providing history information for a plurality of vehicles. The method can include: presenting a vehicle management user interface to a user, the vehicle management user interface including vehicle data representing a plurality of vehicles; receiving a user selection of the vehicle data for at least two vehicles; in response to receiving the user selection, obtaining vehicle status data over a given time period for each of the at least two vehicles; constructing vehicle history timelines for each of the at least two vehicles, where each vehicle history timeline includes the vehicle status data corresponding to one of the at least two vehicles; and outputting the vehicle history timelines for display to the user, where the vehicle history timelines are that can be displayed together on the same time scale.

In certain embodiments, a system for providing history information for a plurality of vehicles includes: a computer system including computer hardware programmed to implement a history module that can at least: obtain first vehicle status data for a given time period corresponding to a first vehicle, the first vehicle status data reflecting telematics data obtained from the first vehicle; obtain second vehicle status data for the same time period corresponding to a second vehicle, the second vehicle status data reflecting telematics data obtained from the second vehicle; construct a first history timeline including the first vehicle status data; construct a second history timeline including the second vehicle status data; and output the first and second history timelines together for presentation to a user.

In certain embodiments, the systems and methods herein can be used to track hundreds, thousands, or even tens of thousands of vehicles or more. The systems and methods herein can be implemented automatically and/or in real time. Thus, the systems and methods described herein are not, in their entirety, able to be implemented as mental processes.

The systems and methods described herein can be implemented by a computer system including computer hardware. The computer system may include one or more physical computing devices, which may be geographically dispersed or co-located.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

The features of embodiments of the inventions disclosed herein are described below with reference to the drawings.

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

As mentioned above, fleet vehicle history information is typically presented in the form of a list having events obtained from vehicle tracking devices. While a list of historical information can be useful, the list format also has drawbacks. For instance, history lists for different vehicles are typically uncorrelated in time and provide no easy way for a user to compare events occurring with respect to multiple vehicles. It can therefore be difficult and time consuming to identify problems such as congregations, where multiple drivers or vehicles congregate in one location, potentially to waste company time. Another drawback to the list format for displaying vehicle histories is that the common practice of vehicle idling, which wastes fuel, may be difficult to identify. Further, a list does not provide an easy way for a fleet administrator to quickly scan a history for various vehicle problems.

Advantageously, this disclosure describes a new vehicle history format for vehicle management systems that, in certain embodiments, addresses at least some of the aforementioned problems. The vehicle history format described herein can also provide additional advantages and benefits. In certain embodiments, a vehicle management system generates a vehicle management user interface that depicts vehicle history information in timelines or graphical timelines. These history timelines can include information regarding vehicle location, speed, and idling, among other useful information. The graphical nature of the history timelines can quickly convey vehicle tracking details and potential problems, such as idling and congregation, to an administrator. Further, history timelines for multiple vehicles can be displayed in parallel, allowing comparison between histories for different vehicles.

The features described herein may also be implemented for non-fleet vehicles, such as for personal vehicles having in-vehicle navigation systems. However, for ease of illustration, the remainder of this disclosure will describe vehicle management systems in the context of vehicle fleets, such as fleets of service vehicles, trucks, taxis, planes, boats, snow mobiles, emergency vehicles, other vehicles, and the like.

II. Vehicle Management System

Figure 1:
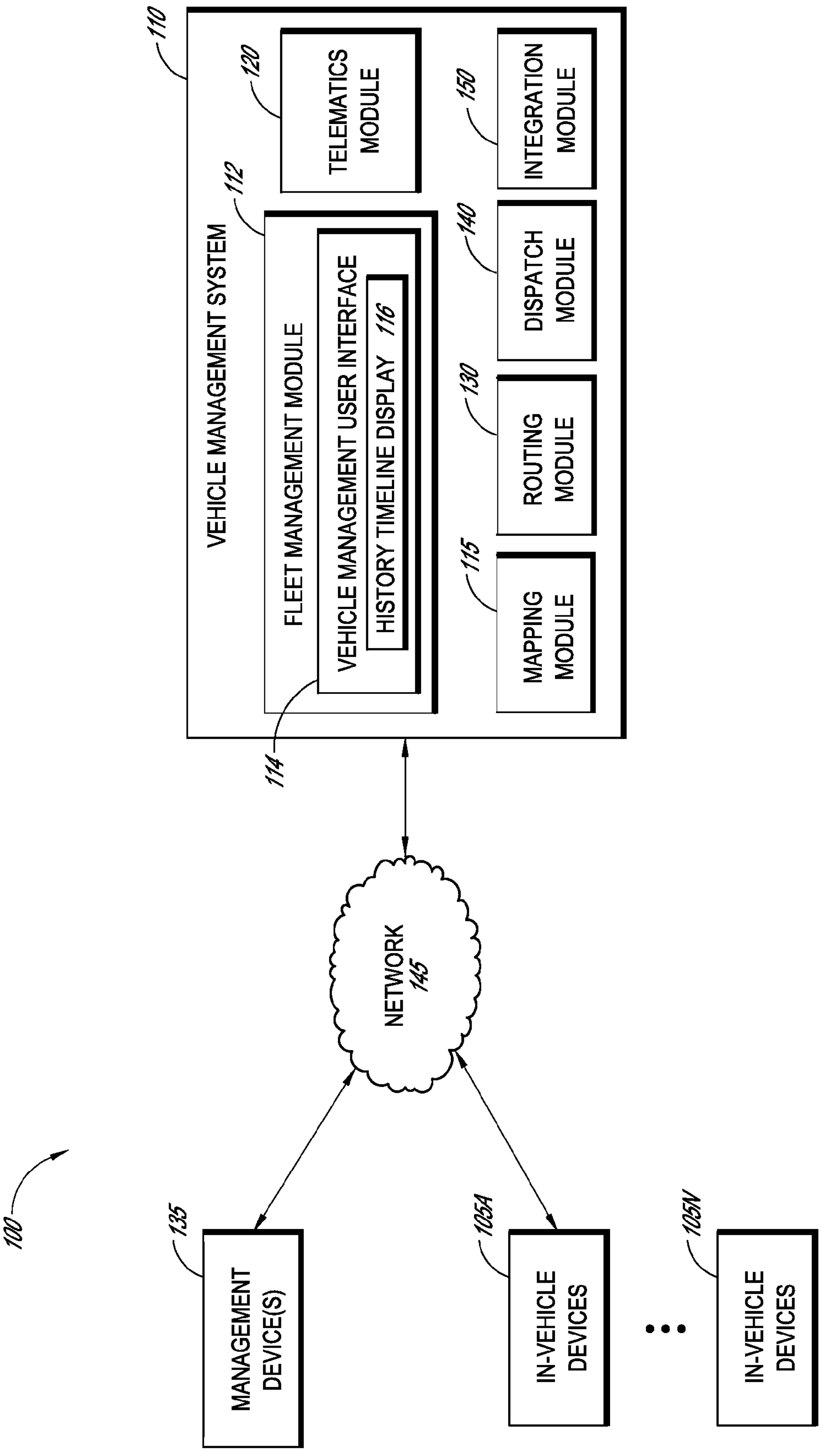
FIG. 1 illustrates an embodiment of a vehicle management system.

FIG. 1 illustrates an embodiment of a computing environment 100 for implementing a vehicle management system 110. Among other features, the example vehicle management system 110 shown can generate a vehicle management user interface that includes vehicle history timelines.

In the computing environment 100, one or more in-vehicle devices 105A . . . 105N and management devices 135 communicate with the vehicle management system 110 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 110. In addition, the in-vehicle devices 105 can report information to the vehicle management system 110, such as driver location, vehicle sensor data, vehicle status (e.g., maintenance, tire pressure, or the like), and so forth.

The management devices 135 can be computing devices used by dispatchers, fleet managers, administrators, or other users to manage different aspects of the vehicle management system 110. For example, a user of a management device 135 can access the vehicle management system 110 to generate routes, dispatch vehicles and drivers, and perform other individual vehicle or fleet management functions. With the management devices 135, users can access and monitor vehicle information obtained from one or more of the in-vehicle devices 105 by the vehicle management system 110. Such vehicle status information can include data on vehicle routes used, stops, speed, vehicle feature usage (such as power take-off device usage), driver behavior and performance, vehicle emissions, vehicle maintenance, energy usage, and the like. In some embodiments, the management devices 135 are in fixed locations, such as at a dispatch center. The management devices 135 can also be used by administrators in the field, and may include mobile devices, laptops, tablets, smartphones, personal digital assistants (PDAs), desktops, or the like.

The vehicle management system 110 can be implemented by one or more physical computing devices, such as servers. These servers can be physically co-located or can be geographically separate, for example, in different data centers. In one embodiment, the vehicle management system 110 is implemented as a cloud computing application. For instance, the vehicle management system 110 can be a cloud-implemented platform hosted in one or more virtual servers and/or physical servers accessible to users over the Internet or other network 145. In the depicted embodiment, the vehicle management system 110 includes a fleet management module 112, a mapping module 115, a telematics module 120, a routing module 130, a dispatch module 140, and an integration module 150. These components can, but need not, be integrated together on a common software or hardware platform.

The fleet management module 112 can include functionality for generating, rendering, or otherwise displaying a vehicle management user interface 114. The vehicle management user interface 114 can include a map or list of vehicles that depicts symbols or other data representative of vehicles. In addition, the vehicle management user interface 114 can advantageously include a history timeline display 116. For example, in response to user selection of one or more of the vehicle symbols from the map or list, the vehicle management user interface 114 can output one or more vehicle history timelines corresponding to the selected vehicle or vehicles. Advantageously, the history timeline display 116 can provide multiple vehicle histories correlated in time or event, thereby allowing comparison of events among vehicles. Viewed another way, the vehicle history timelines can also be considered driver history timelines.

Example vehicle management user interfaces 114 and history timeline displays 116 are described below in detail with respect to FIGS. 3 through 8. Although the fleet management module 112 generates the user interface 114, in certain embodiments the fleet management module 112 outputs the user interface 114 to the management devices 135, which actually display the user interface 114 and associated history timeline display 116. Thus, as used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 112 can communicate with the mapping module 115 to obtain mapping data, which the fleet management module 112 can include in the vehicle management user interface 114. The mapping data can be compressed, transmitted, re-rendered, and displayed on the management user interface 114. Other data can also be overlaid to enhance the map and management layout. The mapping module 115 can be a geographic information system (GIS) in one embodiment. The fleet management module 112 can also access the telematics module 120 to obtain vehicle status data for inclusion in vehicle history timelines. The telematics module 120 can provide this vehicle status data based on telematics data obtained from the in-vehicle devices 105N. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth). The telematics data is described below in greater detail with respect to FIG. 2.

The routing module 130 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. In addition, the routing module 110 can automatically select routes that take into account factors that affect energy usage using the techniques described in U.S. application Ser. No. 12/954,547, filed Nov. 24, 2010, and entitled "Vehicle Route Selection Based on Energy Usage," the disclosure of which is hereby incorporated by reference in its entirety.

The integration module 130 can facilitate integration of the vehicle management system 110 with other systems, such as fuel card systems, payroll systems, supply chain system, insurance systems, and the like. The dispatch module 140 can provide functionality for users of the management devices 135 to assign drivers and vehicles to routes selected by the routing module 110.

Furthermore, although not shown, the vehicle management system 110 may include functionality for disabling an engine remotely to recover a stolen vehicle (as permitted in Europe and some other areas).

The illustrated network 145 may be a LAN, a WAN, the Internet, combinations of the same, or the like. For ease of illustration, the vehicle management system 110 has been depicted as a centralized system. However, in other implementations, at least some of the functionality of the vehicle management system 110 is implemented in other devices. Other possible implementations of the vehicle management system 110 can include many more or fewer components than those shown in FIG. 1.

III. History Timeline Generation Features

Figure 2:
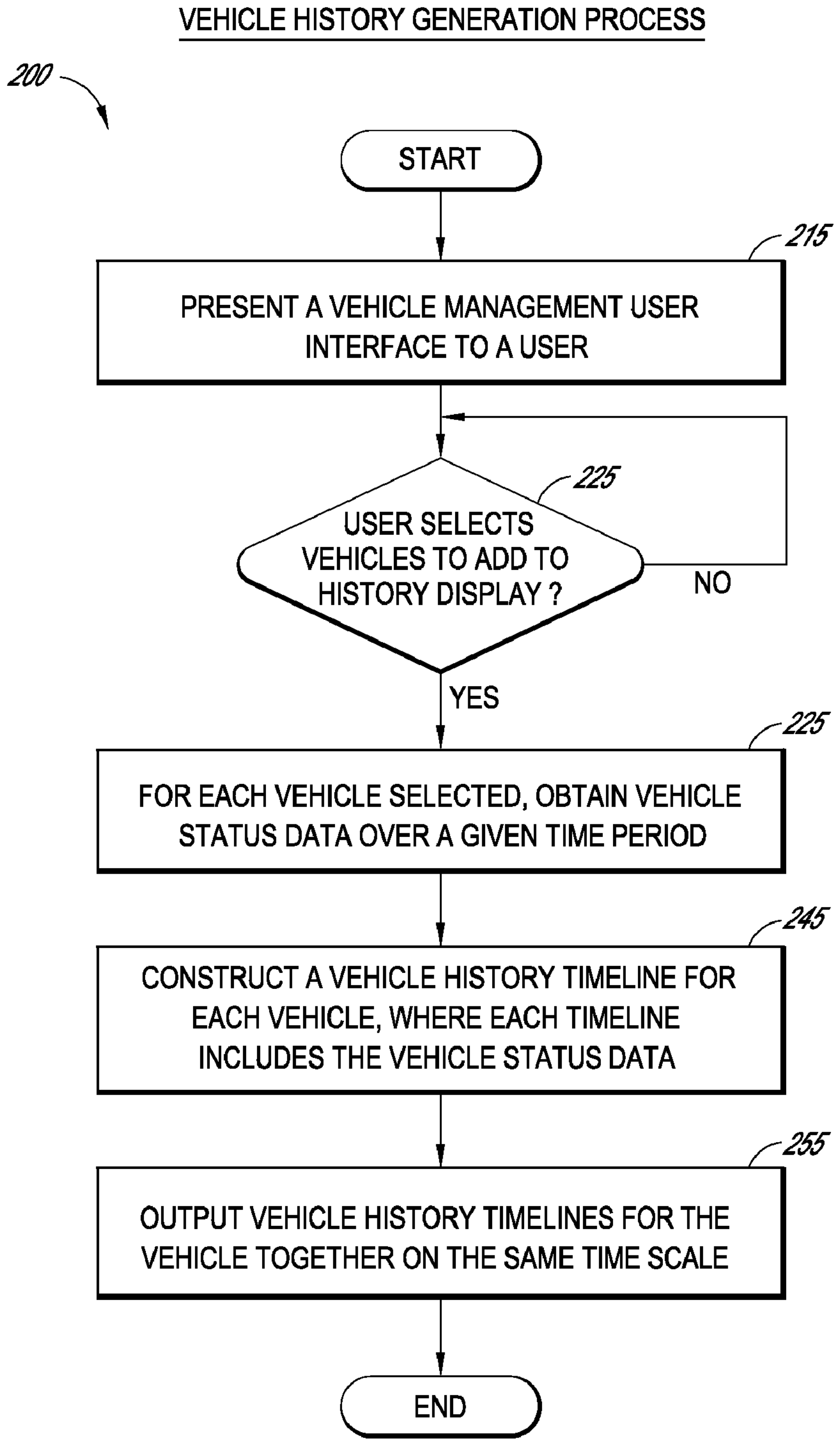
FIG. 2 illustrates an embodiment of a vehicle history generation process that can be implemented by the vehicle management system of FIG. 1.

With reference to FIG. 2, an embodiment of a vehicle history generation process 200 is illustrated. The vehicle history generation process 200 can be implemented by the vehicle management system 110. In particular, the vehicle history generation process 200 can be implemented by the fleet management module 112. In certain embodiments, the vehicle history generation process 200 advantageously generates a vehicle management user interface having a history timeline display. The vehicle history generation process 200 will be described in the context of FIG. 3, which includes an example vehicle management user interface.

At block 215 of FIG. 2, a vehicle management user interface is presented to a user. The user may be an administrator or other user of the management devices 135 described above. The vehicle management user interface may be presented to the user in response to the user requesting access to the vehicle management user interface. For instance, in one embodiment, the user accesses a browser or other network application software installed on a management device 135, which accesses the vehicle management user interface 114 from the vehicle management system 110. The vehicle management user interface 114 can therefore run in a browser, for example, as a web page or the like. The vehicle management user interface 114 could run instead in an application other than a browser in other embodiments.

Figure 3:
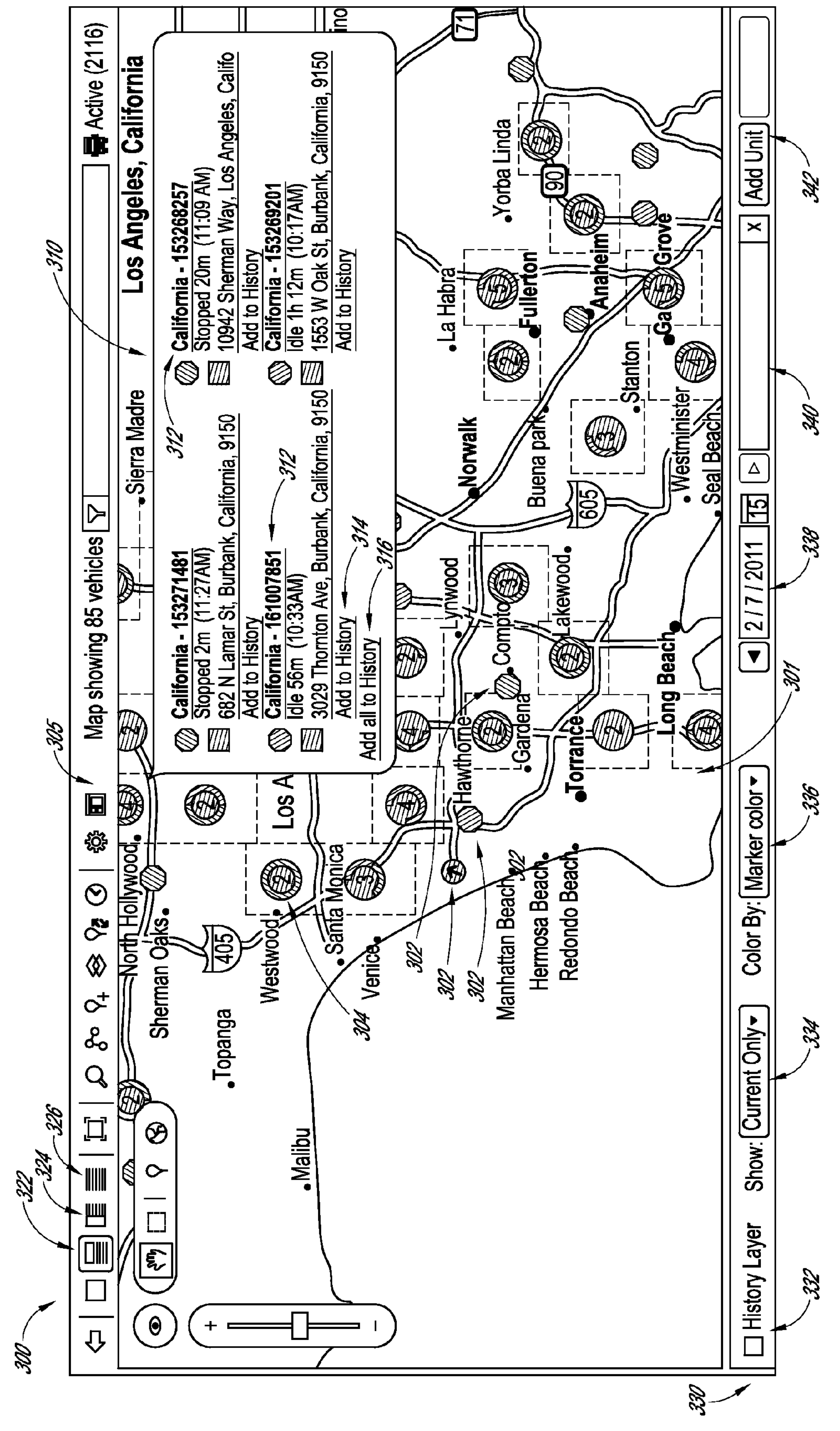
FIGS. 3-8 illustrate embodiments of user interfaces associated with vehicle history displays that can be generated by the vehicle management system.

Turning to FIG. 3, an example vehicle management user interface 300 is shown. The vehicle management user interface 300 includes a map 301 having various symbols 302, 304 that represent vehicles. Two main types of vehicle symbols 302, 304 are shown to represent single vehicles and groups or clusters of vehicles. The symbols 302 include green arrows to indicate movement of a vehicle, blue idle signs to indicate a vehicle that is idling, and red stop signs that indicate vehicles that have stopped. These symbols are merely illustrative examples and can be varied in other embodiments. The symbols 304, in contrast, represent groups or clusters of vehicles. If a user were to zoom in on a cluster 304, the cluster could expand to show individual vehicles (or smaller clusters, should the original cluster 304 represent a large number of vehicles). The vehicle management user interface 300 can therefore incorporate the clustering features described in detail in U.S. application Ser. No. 12/882,930, filed Sep. 15, 2010, and entitled "Real Time Map Rendering With Data Clustering and Expansion and Overlay," the disclosure of which is hereby incorporated by reference in its entirety. Clusters need not be used to represent groups of vehicles, however.

User selection of an individual vehicle symbol 302 or cluster 304 can cause the vehicle management user interface 300 to produce a popup box 310 displaying certain vehicle status information. The example vehicle status information shown in the popup box 310 includes vehicle identifiers 312, addresses of current locations, icons representing the current status of the vehicles (such as green boxes to represent moving, stop signs for stopped vehicles, idle signs etc.). Further, the popup box 310 includes links 314, 316 for adding one or more vehicles to a history display. Selection of the link 314, which says "Add to History" underneath a specific vehicle identifier 312, can add an individual vehicle to a history display. Selection of the link 316, which says "Add all to history," can add all the vehicles shown in the box 310 and corresponding to the selected cluster 304 to a history display.

Figure 4:
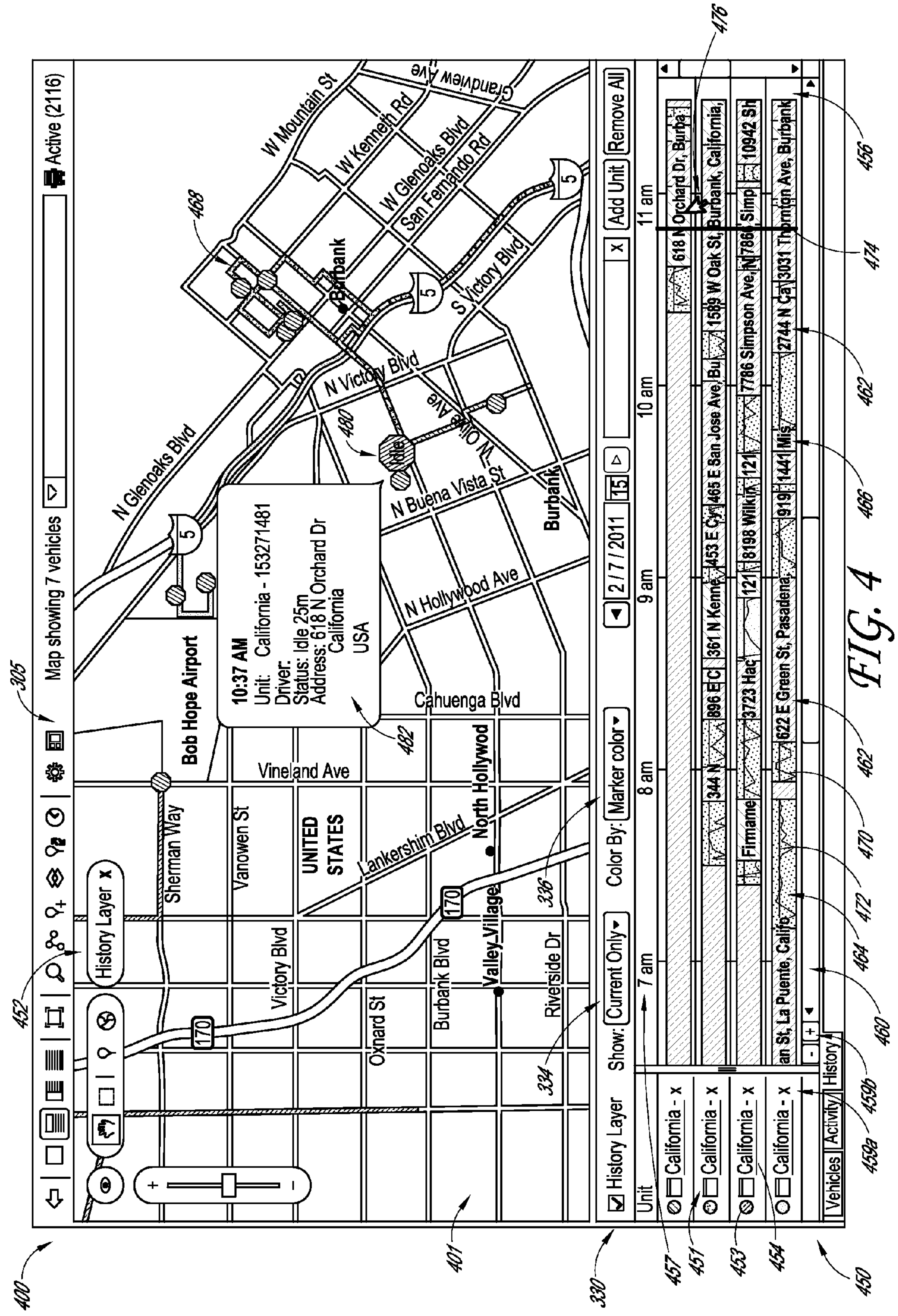

A history timeline display is not shown in FIG. 3 but can be generated from the vehicle management user interface 300 shown in FIG. 3 (see FIG. 4). Toolbars 305, 330 are included as examples of user interface controls that can be used to manage history timeline displays 116. For example, in the toolbar 330, another way to select vehicles to add to a history display is to enter the name of the vehicle in a text box 340 and select an "add unit" button 342. A date for which history can be displayed is also selectable via control 338 in the toolbar 330. Further, the toolbar 330 includes a checkbox control 332 for toggling the history display or history layer. A select box 334 allows current data, key events, and/or all vehicle status data to be displayed on a history timeline. A select box 336 allows different types of timelines to be generated (see below). On the toolbar 305, different buttons 322, 324, and 326 enable different formats for the history display, such as in a frame below the map 301, in a frame to the right (or left) of the map 301, or as a list independent of the map 301. Further, the history display can be provided in a separate window.

Referring again to FIG. 2, it is determined at decision block 225 whether a user selects one or more vehicles to add to a history display. If the user makes no selection, the process 300 effectively loops until a selection is performed. Thus, for example, a history display would be generated in one embodiment if one of the links 314, 316 of FIG. 3 were selected. If the user does select a vehicle or vehicles, at block 225, a vehicle history display is generated using blocks 235 through 255 of the process 300.

At block 235, vehicle status data over a given time period is obtained for each vehicle selected. The time period over which vehicle status data is obtained can be a day, a week, an hour, or the like. The time period can be the current 24-hour period, for instance. History timelines can also be generated for previous days or other past time periods.

The vehicle status data acquired by the telematics module 120 can be obtained by the fleet management module 112. As described above, the telematics module 120 can obtain telematics data from in-vehicle devices 105 or from extra-vehicle devices or locations. Telematics data can include raw vehicle sensor data, such as engine sensor data (which can reflect whether a vehicle is running/idling or turned off), power takeoff device data (which can reflect whether a hydraulic device is operating—see below with respect to FIG. 7), and the like. Further, the telematics data can include raw GPS receiver data (such as latitude, longitude, elevation, and time data).

The telematics module 120 can translate this telematics data into more human-readable vehicle status data, which is accessed at block 225 of the process 300. For instance, the telematics module 120 can translate engine sensor data into information regarding vehicle stop and idle times and information regarding whether a power takeoff device (such as a hydraulic lift) was in use while an engine was running (see below with respect to FIG. 7). As another example, the telematics module 120 can access the GIS software of the mapping module 120 to translate GPS or cellular triangulation data to street address information. In other embodiments, however, the in-vehicle devices can translate the telematics data into the human-readable vehicle status data.

A vehicle history timeline is constructed for each selected vehicle at block 245, and the vehicle history timelines are output together on the same time scale at block 255. Constructing a vehicle history timeline can include accessing or generating graphic elements corresponding to the vehicle status data and arranging the graphic elements together, optionally with text, in a timeline format. The timelines can be constructed in the form of horizontal or vertical bar graphs in one embodiment. Each bar graph can represent a timeline for a specific vehicle. Other formats, including formats that involve solely text rather than graphics, are also possible. For example, the timeline could be in the form of a table, chart, or other data having symbols whose size, color, and/or information included therein change over time. In some embodiments, one or more timelines constitute a Gantt chart or the like.

The selection and arrangement of graphical and textual elements of the timelines can also depend on preferences selected by a user. For instance, a user can select different types of history timelines or history timelines that show different types of status data. In one embodiment, different timelines can be constructed for the same vehicle to reflect different data. Some examples of such data can include information regarding vehicle stop, moving, and idle times, information regarding congregations, warnings regarding policy violations (such as speeding, operating a power takeoff device while moving, or entering or approaching a geofenced (e.g., prohibited) area), and the like. Graphic elements can be used to represent these and other timeline features. Text may also be overlaid over the graphics elements to provide prompting as to the meaning of the graphics elements.

As an example, several vehicle history timelines are shown in FIG. 4. By way of overview, FIG. 4 represents one possible vehicle management user interface 400 that can be generated in response to the "Add all to History" link 316 being selected in FIG. 3. As described above, this link 316 enables each of the vehicles in the popup box 310 of FIG. 3 to be added to a history display. Such a history display 450 is shown in FIG. 4, including a list of the vehicles 451 for which the display 450 is generated and their corresponding history timelines 460.

Similar to the vehicle management user interface 300, the vehicle management user interface 400 includes a map 401. The map 401 depicts routes taken by the vehicles 451 that are the subject of the history display 450. Upon addition of the vehicles 451 to the history display 450, the map 401 has zoomed into an area that depicts routes 468 taken by the vehicles. The routes 468 are illustrated by dashed lines having colors that are also shown in colored circles 453 next to names 454 of the vehicles 451. In one embodiment, these colors 453 are automatically assigned to the vehicles 451 upon insertion into the history display 450. Advantageously, this automatic color assignment can facilitate easier visual associations between the vehicles 451 and their respective routes 468. The colors can be assigned by a random or deterministic algorithm by the fleet management module 112. Further, a control 459*a* is included for removing vehicles 451 from the history display 450. Similarly, a control 452 is also included on the map for removing the history layer.

The toolbars 305, 330 are also included from FIG. 3 and include all the functionality described above with respect to FIG. 3. The select box 336 indicates that the timelines are to be colored or color-coded according to unit status, which can be an (optionally) default type of history timeline 460 or custom history timeline configuration. The unit status type of timeline can reflect a general status of the units, or vehicles 451, shown in the history display 450. Accordingly, in the depicted embodiment, the history timelines 460 each reflect general status information about the vehicles 451, such as moving, stopped, and idle times, as well as other information.

Referring more particularly to the history timelines 460, each history timeline 460 is depicted as a horizontal, possibly segmented, bar or bar graph. These bars can be multicolored to reflect different types of vehicle status according to the selected "unit state" timeline configuration. For instance, red sections 462 can reflect stoppage times, green sections 464 can reflect moving times, and blue sections 466 can reflect engine idle times. In addition, it is possible to display a bar as having multiple strips, each having different status information that may include color-coded status, text, or both. Advantageously, in the depicted embodiment, the history timelines 460 depict an easy-to-read view of idle times, allowing an administrator to take action to reduce the idle times (e.g., by talking with a driver, providing incentives for idle reduction, or the like). Engine idle times can be detected in one embodiment from the vehicle status data provided by the telematics module 120. As described above, the telematics module 120 can determine idle times based on engine sensors in vehicles, which can determine whether a vehicle is running but not moving (or in conjunction with GPS location information that reflects lack of movement).

In many instances, when a vehicle is stopped or idling, the history timeline 460 for that vehicle includes the text of the address that the vehicle is or was located at. This text can be obtained by the telematics module 120, which accesses GIS data in the mapping module 115, as described above. Further, the moving portion 464 of the timelines 460 also includes a speed indicator 470 that reflects a speed of a vehicle 451. This speed indicator 470 is a graph or plot that is normalized with respect to a posted speed limit, shown as a straight line 472 across the speed indicator 470 plot. Thus, segments of the speed indicator 470 above the line 472 represent violations of the speed limit. The speed indicator 470 can therefore provide at-a-glance information about speeding violations to administrators, who can take action to reduce speeding violations.

A pointing device cursor 476 is also shown overlaid on the timeline display 460. In response to the cursor 476 overlaying or mousing over a timeline, a popup box 482 can be output on the map 401. This popup box 482 can include vehicle status information corresponding to the moment in time at which the cursor 476 is pointing. A time scale 457 is shown above the history timelines 460 to indicate which points on the history timelines 460 correspond to which time in a given time period. The time scale 457 shown corresponds to the current day, and data for the current day shown ends at about 11:30 am. As the day progresses, the timelines 460 can expand to include more vehicle status information.

The time scale 457 can be zoomed in or out by use of the plus/minus buttons 459*b* located at the bottom of the history display 450. Zooming out shows more time, in one embodiment, up to the entire current day or more, while zooming in allows closer inspection of driver/vehicle activities occurring during a shorter time frame.

One advantage in certain embodiments of plotting the history timelines 460 of multiple vehicles 451 together with the same time scale 457 is that the activities of the drivers and vehicles 451 can be time-aligned and compared. This feature can be used advantageously to identify congregations of vehicles at the same location (see, e.g., FIG. 8).

A timeline selection bar 474 is also shown. The timeline selection bar 474 is a vertical bar in the depicted embodiment, which extends over each of the history timelines 460. The bar 474 can be selected by a pointing device (e.g., a mouse) and dragged from left to right along the history display 450. Dragging the bar 474 along the history display can cause symbols for the vehicles 451 on the map 401 to trace their routes 468 in time. Thus, for example, if the timeline selection bar 474 is dragged to the right, the vehicle under the cursor 476 while the bar 474 is dragged can have its route 468 traced forward in time on the map 401. Conversely, if the bar 474 is dragged to the left, the vehicle under the cursor 476 can have its route 468 traced backward in time. In another embodiment, each of the vehicles routes 468 are traced as the timeline selection bar 474 is dragged along the history display 450. A horizontal timeline selection bar 474 can be used in other embodiments where the history timelines 460 are vertical bars. The horizontal timeline selection bar 474 can be a different shape or user interface control than a bar in some embodiments. For example, the bar 474 could instead be a horizontal slider control, or an arrow(s), or some other configuration.

It should be noted that the fleet management module 112 can use any of a variety of technologies to generate the vehicle management user interface 400 or any of the other user interfaces described herein. For instance, the user interfaces described herein can be implemented using HTML, JavaScript, CSS, JSON, and/or XML programming. Such programming may be AJAX compliant. In some embodiments, the fleet management module 112 generates dynamic HTML, XHTML, or XML pages that include the content shown in any of the user interfaces depicted herein. This dynamic functionality can allow timelines 460 to be added and removed, colored, zoomed, or otherwise adjusted. The fleet management module 112 can generate this content in response to a request from a management device 135 described above. Other examples of technology for dynamically generating and/or manipulating the history displays or other user interfaces described herein include Adobe Flash, Java, Java Applets, Silverlight, Synchronized Multimedia Integration Language (SMIL), ASP.NET, iframes, jQuery, PHP, J2EE, combinations of the same, and the like. Further, vehicle status data, telemetry data, and history timeline data can be stored in any data repository having physical computer storage, such as a database, file system, other data store, or a combination of the same.

Figure 5:
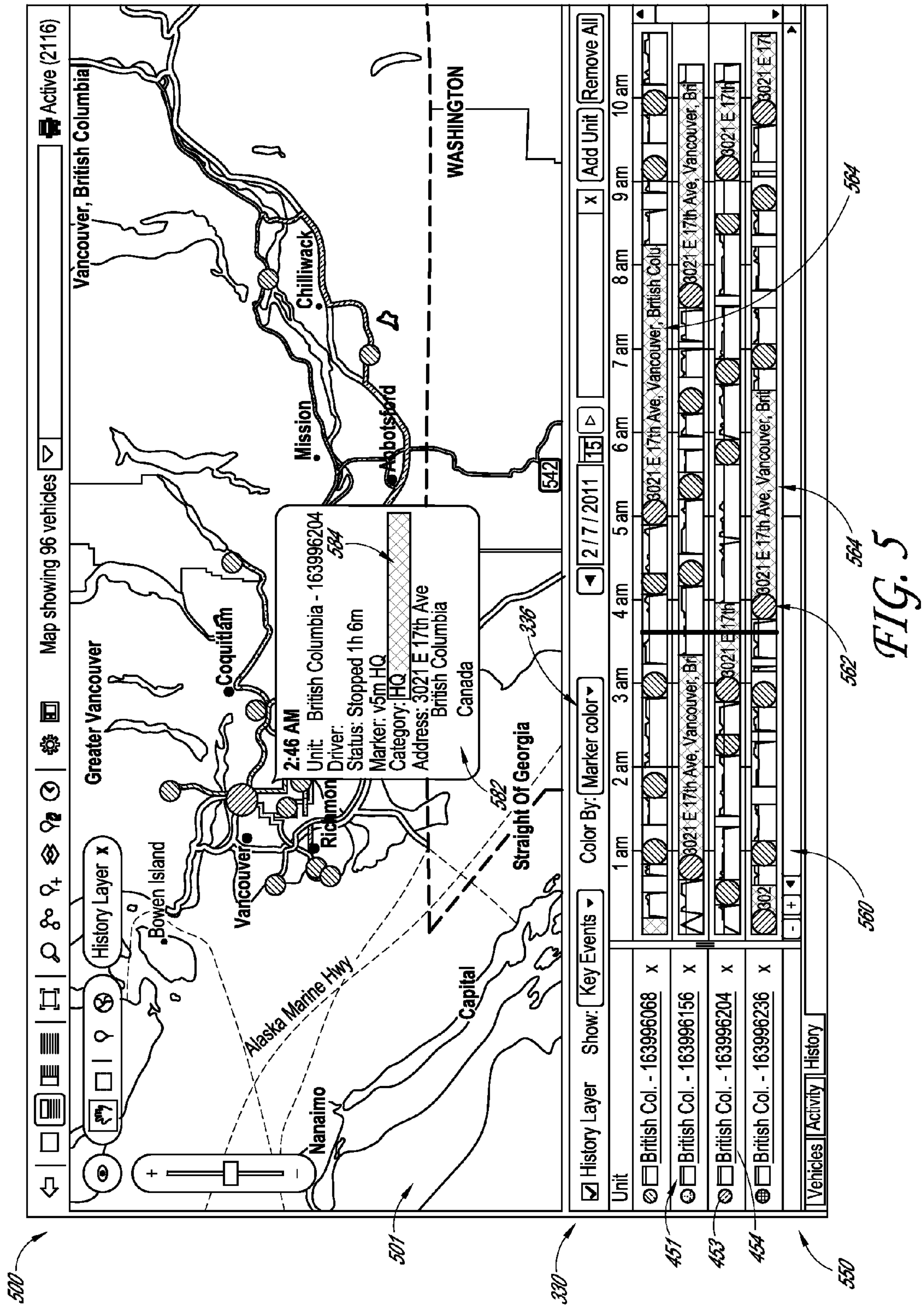
Figure 6:
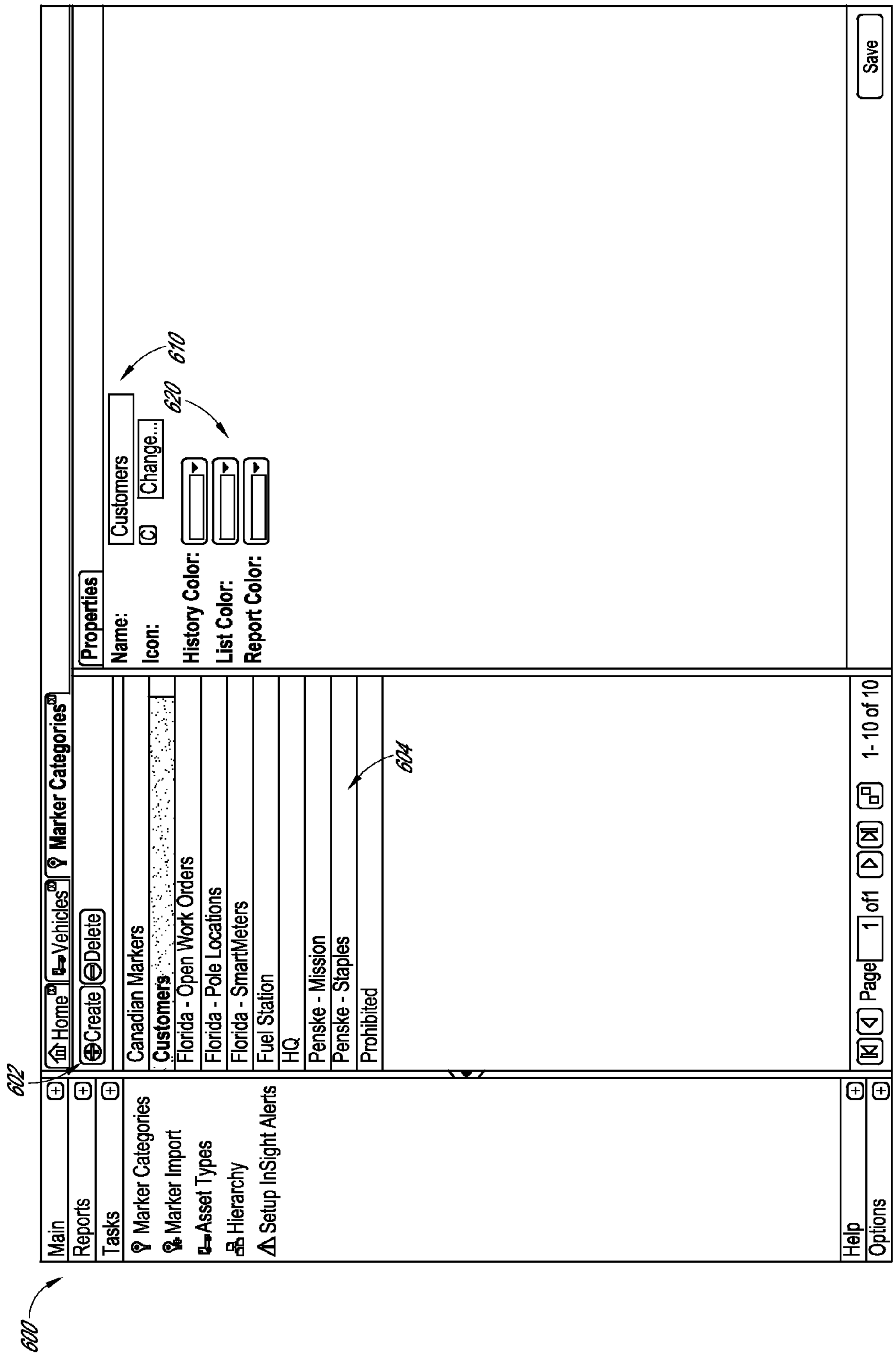

As described above, the select box 336 allows different types or configurations of timelines to be generated. Referring to FIG. 5, another type of vehicle management user interface 500 is shown with a different option selected in the select box 336. This option causes the timelines to be colored according to markers. In one embodiment, the markers can represent locations identified by a user (such as an administrator) as being significant. Referring to FIG. 6, for example, a marker definition user interface 600 is shown that allows a user to define markers 604, such as customer locations, fuel stations, headquarters (HQ), and so on. Using the user interface 600, a user can assign a history color 620 for a given marker 604, which color can appear on a history timeline when a vehicle has visited a site associated with a marker. Similarly, a name 610 and icon can be specified for the marker 604.

Referring again to FIG. 5, a history display 550 is shown, which can include some or all of the functionality of the history display 450. For example, the history display 550 includes history timelines 560 similar to the history timelines 460 shown in FIG. 4. However, the history timelines 560 are colored monochrome except for times when vehicles visited marker locations. Thus, while speed indication plots and speed normalization lines are still shown (see description above with respect to FIG. 4), these features are in monochrome instead of in green as above. In the depicted embodiment, the marker colors are on portions 564 of each timeline to reflect a marker for the fleet headquarters. A popup box 582 corresponding to the headquarters location also depicts the marker color 584 for the marker. Further, an icon 562 corresponding to the marker for HQ is also displayed on the history timelines 560, and a similar marker 570 is shown on the map 501 at the location of the site associated with the marker.

FIG. 5 demonstrates the flexibility of the history display 550. Different color schemes, icons, and other graphics can overlay a history timeline 560 to present different status information for a user. This status information can be selected with a simple click of a button, e.g., selection in the select box 336. As shown in FIG. 6, the types of data that can be displayed on a history timeline 560 can be customized by a user. Thus, the history display 550 and associated timelines 560 can provide far more useful and flexible information than existing history lists used in fleet management systems.

Figure 7:
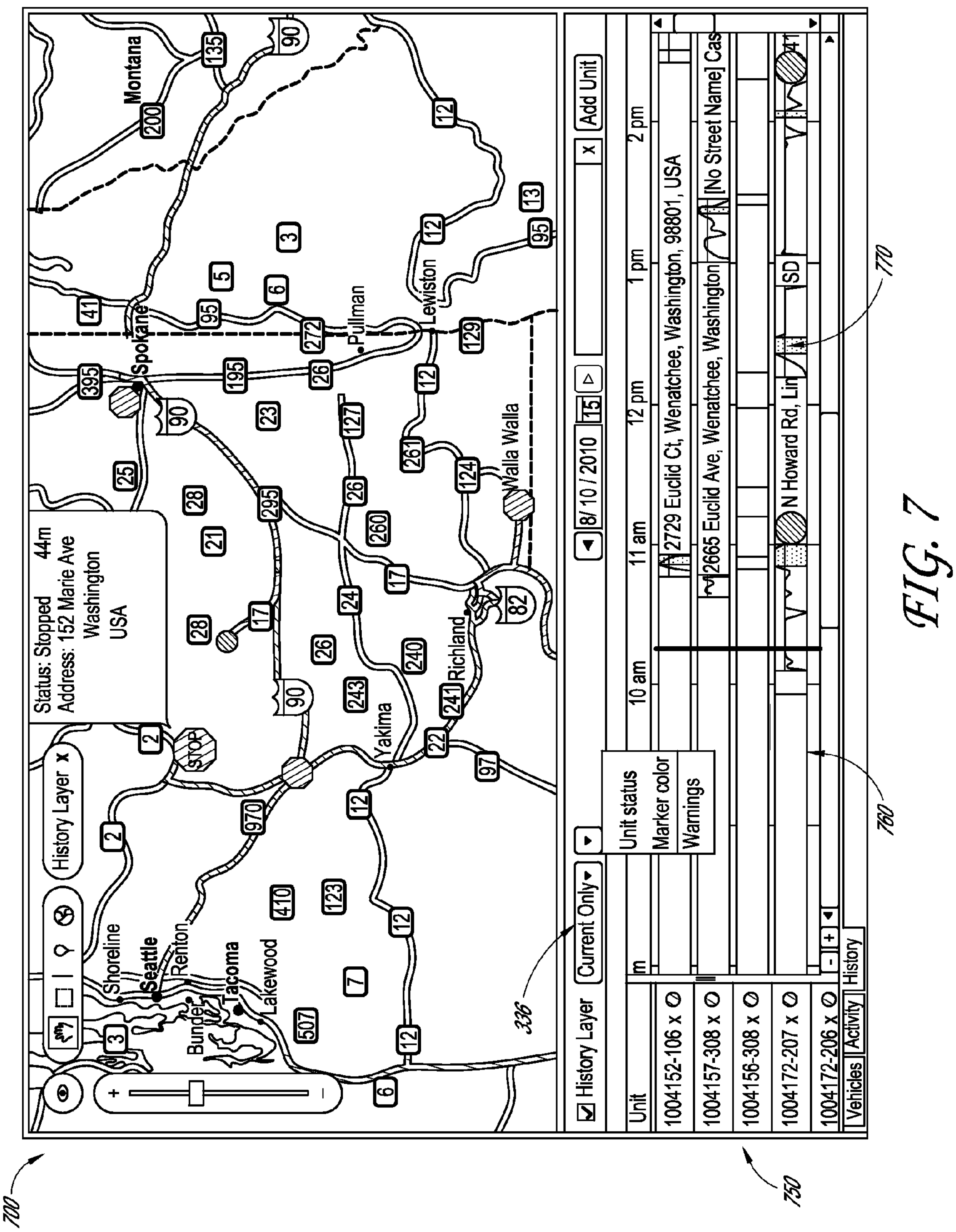

As yet another demonstration of the flexibility of the history display 550, another example history display 760 is shown in FIG. 7. The history display 750 can likewise include any of the features described above with respect to the history displays 450 and 550. In the depicted embodiment, user selection of the select box 336 has selected the criteria "warnings" to color history timelines 760 in the history display 750. Warnings can be alarms or alerts that are user-configured using a user interface similar to the user interface 600 of FIG. 6. Red areas 770 on the history timelines 760 include colored warnings, which in the depicted embodiment, represent speeding violations. Alarms or alerts can be registered visually as a color change, size change, or symbol appearance on the history display 750. Other warnings can also be provided and customized by a user.

Another example of a warning is a power takeoff device violation. As described above, the telematics module 120 can collect data regarding power takeoff device activation, such as hydraulic lift activations in garbage trucks or dump trucks. The organization that manages the vehicle management system 110 may have a policy that operating a power takeoff device while moving a vehicle is unsafe. Thus, an administrator may configure the fleet management module 112 to display a warning, if the "display warning option" is selected, whenever this unsafe condition occurs. For instance, the fleet management module 112 could superimpose a warning icon on a history timeline 760 in response to this condition occurring.

Other examples of warnings or alarms can include engine overheating alarms (as detected by an engine temperature sensor), tire pressure alarms (detected by a tire pressure sensor), driver driving time exceeded (e.g., according to legal or company policy limits), driver seat belt not buckled, reversing a vehicle when it may be dangerous to do so, and the like. Many other conditions can be detected and programmed to generate warnings; also, warnings can be user-defined.

Figure 8:
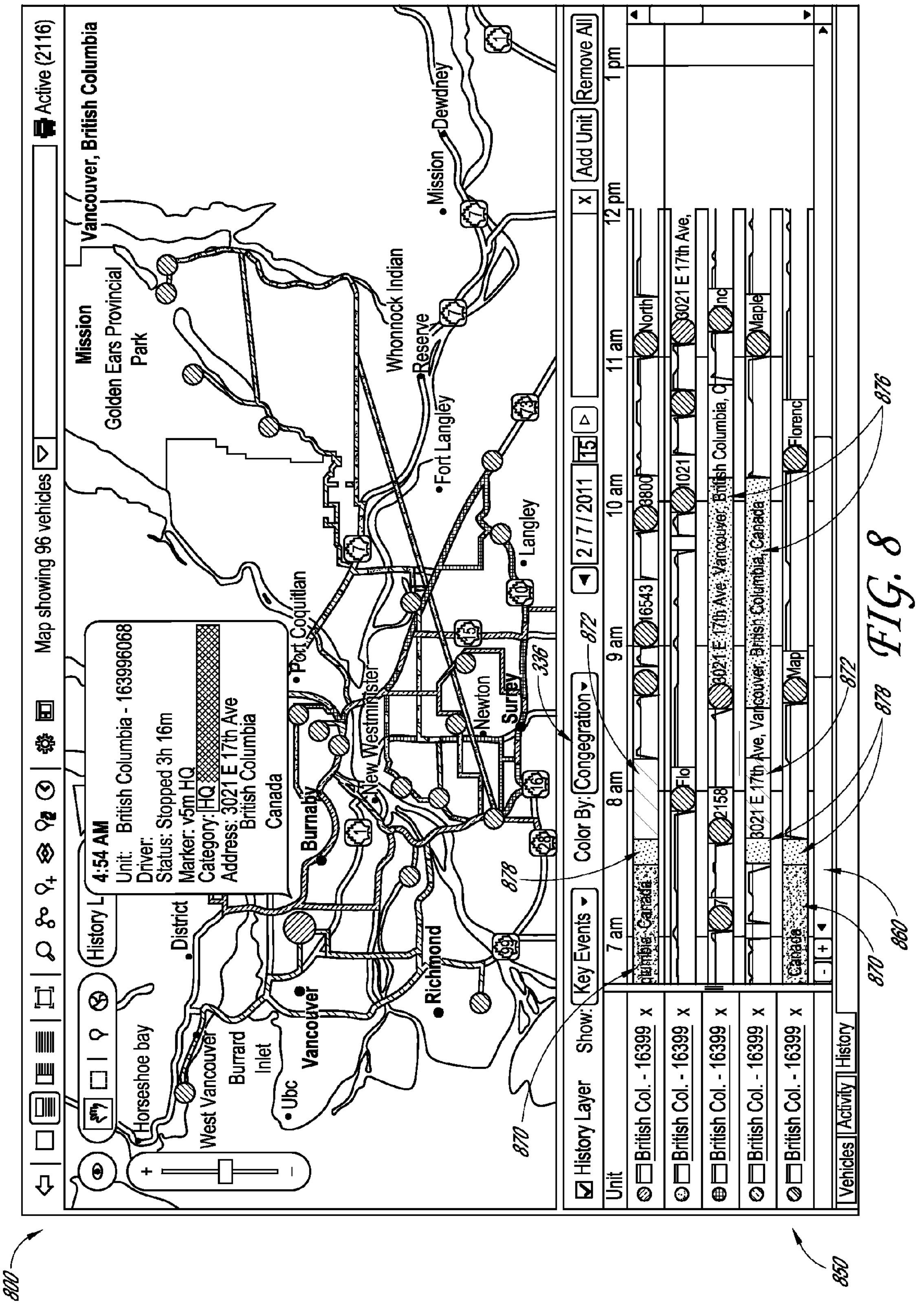

FIG. 8 illustrates yet another vehicle management user interface 800. The vehicle management user interface 800 can include all the features of the user interfaces described above. The depicted example vehicle management user interface 800 illustrates timeline coloring to show congregations. The select box 336 includes the "color by congregation" timeline configuration selected, which can cause history timelines 870 in a history display 850 of the user interface 800 to be monochrome except for congregation events. Thus, colors are applied to two or more of the timelines 870 in response to vehicles congregating at one location.

In the depicted embodiment, congregations have been detected between various vehicles because several vehicles were co-located at headquarters together. The portions 870 of two history timelines 860 colored in one color (such as blue) at the same reflect that these two vehicles congregated at the address listed in those portions 870. Similarly, portions 872, portions 876, and portions 878 reflect congregations of multiple vehicles. By displaying parallel history timelines 860, these congregations are much easier to visualize than would be possible with the history lists in existing systems.

It should be noted that in some embodiments, any of the timeline features described above can be combined, such as any subset of the timeline configuration options described. For instance, the timeline configurations can be combined, e.g., such that colored warnings are superimposed on unit status-colored timelines. Congregations (or some other feature) could be shown using a visualization effect other than coloring, such as by hatch marks or different-shaped timelines. Many other configurations are possible.

In addition to these congregation features, a vehicle management user interface can adjust the timeline of one vehicle based on the actions of another. For instance, if it is known that a first vehicle on one area is running low or is out of fuel, the fleet management module 112 can detect other vehicles headed toward the first vehicle and output a warning that such vehicles may also run low or out of fuel.

IV. Additional Embodiments

For convenience, this specification refers to the generation of timeline displays primarily in the context of vehicle histories. The history of a vehicle, however, is just one dimension of possibly several that can be used to generate a timeline display. In certain embodiments, the fleet management module 112 can generate timeline displays for any of the following history dimensions, in addition to or instead of a vehicle or trip history dimension: a driver history, the engine history, and a maintenance or service history of a vehicle.

For instance, a timeline directed toward the driver dimension can include information regarding any of the following characteristics of the driver: the driver's health, temperature, other sensor data from any sensors coupled with the driver, indications of whether the driver is falling asleep (e.g., as indicated by physiological sensor(s)), a driver's schedule (such as days off and on, break times, etc.), and the like. Engine history could include information obtainable from any engine sensor, such as RPMs, fuel levels, speed, odometer readings, and the like. Maintenance history can include a history of preventative maintenance (PM) events that occur in the life of a vehicle, such as oil changes, brake checks, etc.

Any of these dimensions may be selected for viewing by a user on a history display. Multiple such dimensions can be displayed at the same time on separate timelines, or data from multiple dimensions may be overlaid on a single timeline. If the history is displayed as a chart or table instead of a timeline, data from multiple dimensions can be displayed together in a single chart or table. More generally, in one embodiment, vehicle status data can encompass the data described with any subset of the history dimensions described herein.

In another embodiment, colors for any of the clusters, timelines, or icons described can change to reflect a changing event, a warning, or an important event, among other reasons.

V. Terminology

Many variations other than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Execution in a cloud computing environment in some embodiments supports a multiplicity of conditions to be computed contemporaneously.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 110 or 210 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for providing history information for a plurality of vehicles, the system comprising:

a computer system comprising computer hardware programmed to implement a user interface module configured to at least:

receive telematics data from Global Positioning System (GPS) devices of a plurality of vehicles in a vehicle fleet, the telematics data comprising location information for the vehicles over time;

generate a vehicle management user interface comprising data representing the plurality of vehicles;

output the vehicle management user interface for presentation to a user, the vehicle management user interface comprising a map depicting the plurality of vehicles for selection by the user;

receive a selection by the user of first vehicle data from the vehicle management user interface, the first vehicle data representing a first vehicle of the plurality of vehicles;

in response to receiving the selection of the first vehicle data, outputting a first vehicle history timeline comprising first vehicle status data reflecting at least a portion of the telematics data corresponding to the first vehicle;

receiving a second selection by the user of second vehicle data from the vehicle management user interface, the second vehicle data representing a second vehicle of the plurality of vehicles; and in response to receiving the second selection of the second vehicle data, outputting a second vehicle timeline comprising second vehicle status data reflecting at least a portion of the telematics data corresponding to the second vehicle, the second vehicle timeline configured to be displayed together with the first vehicle timeline such that the first and second vehicle timelines are configured to be correlated in time, thereby enabling a visual comparison of the first and second vehicle status data.

2. The system of claim 1, wherein the user interface module is further configured to construct the first and second vehicle timelines by at least generating an indication reflecting a congregation of the at least two vehicles at a particular location, the indication being correlated in time on the first and second vehicle timelines.

3. The system of claim 1, wherein the user interface module is further configured to construct the history vehicle timelines by at least generating an indication of idling by any of the at least two vehicles.

4. The system of claim 1, wherein the user interface module is further configured to construct the history vehicle timelines by at least generating an indication of a policy violation by any of the at least two vehicles.

5. The system of claim 1, wherein the first and second vehicle timelines are configured to be displayed in parallel with respect to each other in either a horizontal or vertical orientation.

6. The system of claim 1, wherein the first and second selections occur at the same time.

* * * * *